(12) United States Patent
Jiang

(10) Patent No.: US 11,363,639 B2
(45) Date of Patent: Jun. 14, 2022

(54) RANDOM ACCESS METHOD AND DEVICE, USER EQUIPMENT AND BASE STATION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 136 days.

(21) Appl. No.: 16/782,914

(22) Filed: Feb. 5, 2020

(65) Prior Publication Data
US 2020/0178312 A1 Jun. 4, 2020

Related U.S. Application Data

(63) Continuation of application No. PCT/CN2017/097617, filed on Aug. 16, 2017.

(51) Int. Cl.
*H04W 74/08* (2009.01)
*H04W 24/08* (2009.01)
(Continued)

(52) U.S. Cl.
CPC ....... *H04W 74/0833* (2013.01); *H04W 24/08* (2013.01); *H04W 72/046* (2013.01);
(Continued)

(58) Field of Classification Search
CPC ........... H04W 52/367; H04W 72/0453; H04W 72/0466; H04W 76/11; H04W 72/046;
(Continued)

(56) References Cited

U.S. PATENT DOCUMENTS

2015/0181575 A1* 6/2015 Ng .................. H04W 72/042
370/329
2016/0219569 A1 7/2016 Kuo et al.
(Continued)

FOREIGN PATENT DOCUMENTS

CN 104956606 A 9/2015
CN 106922033 A 7/2017
(Continued)

OTHER PUBLICATIONS

Supplementary European Search Report in European Application No. 17922035.5, dated Feb. 25, 2021.
(Continued)

*Primary Examiner* — Brian D Nguyen
(74) *Attorney, Agent, or Firm* — Finnegan, Henderson, Farabow, Garrett & Dunner, L.L.P.

(57) ABSTRACT

A random access method for user equipment, includes: when initiating random access, acquiring a Physical Random Access Channel (PRACH) resource for multi-preamble transmission from a presently associated downlink beam, wherein the PRACH resource is to indicate a multi-preamble transmission opportunity; starting preamble transmission from a time-frequency resource position in the present multi-preamble transmission opportunity, and when transmission of all preambles is ended, starting monitoring a random access response (RAR) receiving window; and if an RAR is received in the RAR receiving window, determining a sending beam that the RAR corresponds to, sending a message MSG3 to a base station through the sending beam, and waiting to receive a message MSG4 returned by the base station.

18 Claims, 8 Drawing Sheets

When initiating random access, a PRACH resource for multi-preamble transmission is acquired from a presently associated downlink beam — S101

Preamble transmission is started from any time-frequency resource position in the present multi-preamble transmission opportunity, and when transmission of all preambles is ended, monitoring a RAR receiving window is started — S102

If a RAR is received in the RAR receiving window, a sending beam that the RAR corresponds to is determined, MSG3 is sent to a base station through the sending beam, and MSG4 returned by the base station is waited to be received — S103

(51) Int. Cl.
*H04W 76/11* (2018.01)
*H04W 72/04* (2009.01)

(52) U.S. Cl.
CPC ... *H04W 72/0446* (2013.01); *H04W 72/0453* (2013.01); *H04W 76/11* (2018.02)

(58) Field of Classification Search
CPC .............. H04W 74/0833; H04W 24/08; H04W 74/004; H04W 74/006; H04W 74/0866
See application file for complete search history.

(56) References Cited

U.S. PATENT DOCUMENTS

| | | | |
|---|---|---|---|
| 2016/0270121 | A1 | 9/2016 | Bergström et al. |
| 2016/0345325 | A1* | 11/2016 | Liu ................... H04W 74/0833 |
| 2018/0042050 | A1* | 2/2018 | Kim .................. H04W 74/0825 |
| 2019/0215325 | A1* | 7/2019 | Glass .................... H04W 12/02 |
| 2020/0084751 | A1* | 3/2020 | Papasakellariou .... H04L 5/0094 |
| 2020/0128587 | A1* | 4/2020 | Qian ................. H04W 74/0833 |
| 2020/0017831 | A1 | 6/2020 | Jiang |
| 2020/0178310 | A1* | 6/2020 | Jiang ................ H04W 74/0833 |
| 2020/0187256 | A1* | 6/2020 | Lim .................... H04W 72/042 |
| 2020/0196303 | A1* | 6/2020 | Lee ...................... H04W 72/005 |
| 2021/0051725 | A1* | 2/2021 | Tang .................... H04B 17/318 |
| 2021/0359747 | A1* | 11/2021 | Islam .................... H01Q 1/245 |
| 2021/0368551 | A1* | 11/2021 | Xiong ................. H04W 72/042 |

FOREIGN PATENT DOCUMENTS

| | | |
|---|---|---|
| CN | 107006037 A | 8/2017 |
| CN | 107211451 A | 9/2017 |
| EP | 3 048 851 A1 | 7/2016 |
| EP | 3 668 247 A1 | 6/2020 |
| WO | WO 2016/086144 A1 | 6/2016 |
| WO | WO 2017/115126 A1 | 7/2017 |

OTHER PUBLICATIONS

Interdigital Inc: "Multiple Msg1 transmissions for one monitored RAR window", 3GPP TSG-RAN WG1 #89, R1-1708992, Hangzhou, P.R. China, May 15-19, 2017, 3 pages.
Vivo: "RACH procedure of multiple preambles transmission", 3GPP TSG-RAN WG2 NR Ad Hoc, R2-1707078, Qingdao, China, Jun. 27-29, 2017, 6 pages.
Samsung: "Random Access Procedure—Access Delay Minimisation", 3GPP TSG-RAN WG2 NR#2, R2-1706535, Qingdao, China, Jun. 27-29, 2017, 3 pages.
Samsung: "Random Access Procedure in NR", 3GPP TSG-RAN WG2 #96, R2-167568, Reno, USA, Nov. 14-18, 2016, 7 pages.
International Search Report in the International Application No. PCT/CN2017/097617, dated May 3, 2018.
English translation of the Written Opinion of the International Search Authority in the International Application No. PCT/CN2017/097617, dated May 3, 2018.
Huawei et al., RACH Procedures and Resource Configuration, 3GPP TSG RAN WG1 NR Ad Hoc Meeting, Jan. 16-20, 2017, Spokane, USA, pp. 1-7.
First Office Action of Chinese Application No. 201780001371.3, dated Jul. 23, 2020.

* cited by examiner

RANDOM ACCESS METHOD AND DEVICE, USER EQUIPMENT AND BASE STATION

CROSS-REFERENCE TO RELATED APPLICATIONS

This application is a continuation of International Application No. PCT/CN2017/097617, filed on Aug. 16, 2017, the entire contents of which are incorporated herein by reference.

TECHNICAL FIELD

The present disclosure generally relates to the technical field of communication technologies, and more particularly to a random access method and device, user equipment (UE), a base station and a computer-readable storage medium.

BACKGROUND

In a Long Term Evolution (LTE) system, a base station sends a broadcast to cover a whole sector through a beam. In New Radio (NR), a base station may cover a sector in a relatively narrow beam scanning manner, namely the base station sends only one narrow beam in a certain direction at a certain moment and then continuously changes the direction of the beam to cover the sector. This scenario is called a multi-beam scenario.

In the multi-beam scenario, UE measures downlink signals to associate with a best downlink beam at first. For a UE with Transmission-Reception (Tx-Rx) correspondence ability, the UE may receive a downlink beam to determine a most suitable uplink beam. However, for a UE without the Tx-Rx correspondence ability, the UE may not determine its own uplink beam and the UE is required to try to transmit through different beams to determine a most suitable uplink beam.

For random access, the UE without the Tx-Rx correspondence ability may send multiple preambles to ensure that a base station receives a preamble, and this is multi-preamble transmission in the multi-beam scenario.

SUMMARY

According to a first aspect of embodiments of the present disclosure, a random access method for user equipment (UE) includes: when initiating random access, acquiring a Physical Random Access Channel (PRACH) resource for multi-preamble transmission from a presently associated downlink beam, wherein the PRACH resource is to indicate a multi-preamble transmission opportunity; starting preamble transmission from a time-frequency resource position in the present multi-preamble transmission opportunity, and when transmission of all preambles is ended, starting monitoring a random access response (RAR) receiving window; and if an RAR is received in the RAR receiving window, determining a sending beam that the RAR corresponds to, sending a message MSG3 to a base station through the sending beam, and waiting to receive a message MSG4 returned by the base station.

According to a second aspect of the embodiments of the present disclosure, a random access method for a base station includes: receiving a preamble transmitted by user equipment (UE) through a multi-preamble transmission opportunity; returning a random access response (RAR) for the preamble and a time-frequency resource position in the multi-preamble transmission opportunity to the UE in a corresponding RAR sending window according to the time-frequency resource position, where the received preamble is located, in the multi-preamble transmission opportunity, to enable the UE to determine a sending beam that the RAR corresponds to, wherein the RAR sending window corresponds to an RAR receiving window configured for the UE to receive the RAR; and receiving a message MSG3 sent by the UE through the sending beam, and returning a message MSG4 to the UE according to the message MSG3.

According to a third aspect of the embodiments of the present disclosure, UE includes: a processor; and a memory configured to store an instruction executable for the processor, wherein the processor is configured to: when initiating random access, acquire a Physical Random Access Channel (PRACH) resource for multi-preamble transmission from a presently associated downlink beam, wherein the PRACH resource is to indicate a multi-preamble transmission opportunity; start preamble transmission from a time-frequency resource position in the present multi-preamble transmission opportunity indicated by the PRACH resource and, when transmission of all preambles is ended, start monitoring a random access response (RAR) receiving window; and if an RAR is received in the RAR receiving window, determine a sending beam that the RAR corresponds to, send a message MSG3 to a base station through the sending beam and wait to receive a message MSG4 returned by the base station.

It is to be understood that the above general descriptions and detailed descriptions are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments will now be described in detail, examples of which are illustrated in the accompanying drawings. In the following description, unless otherwise represented, the same reference numbers in different drawings represent the same or similar elements when referring to the accompanying drawings. The implementations set forth in the following description of the exemplary embodiments do not represent all implementations consistent with the present disclosure. Instead, they are merely examples of devices and methods consistent with some aspects of the present disclosure as recited in the appended claims.

Figure 1:
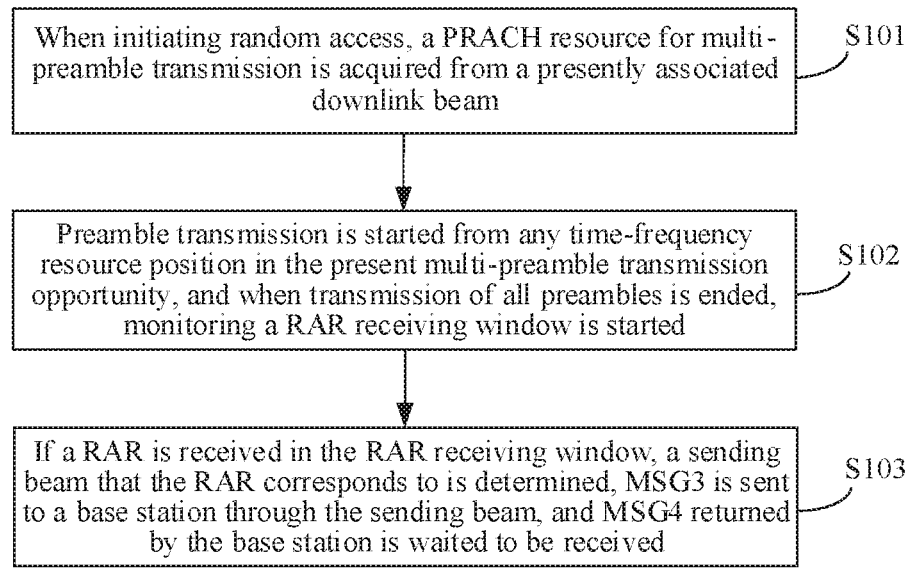
FIG. 1 is a flow chart illustrating a random access method, according to an exemplary embodiment.

FIG. 1 is a flow chart showing a random access method, according to an exemplary embodiment of the present application. For example, the random access method may be performed by UE. As shown in FIG. 1, the random access method includes the following operations.

In S101, when initiating random access, a Physical Random Access Channel (PRACH) resource for multi-preamble transmission is acquired from a presently associated downlink beam. The PRACH resource is to indicate a multi-preamble transmission opportunity.

Figure 2A:
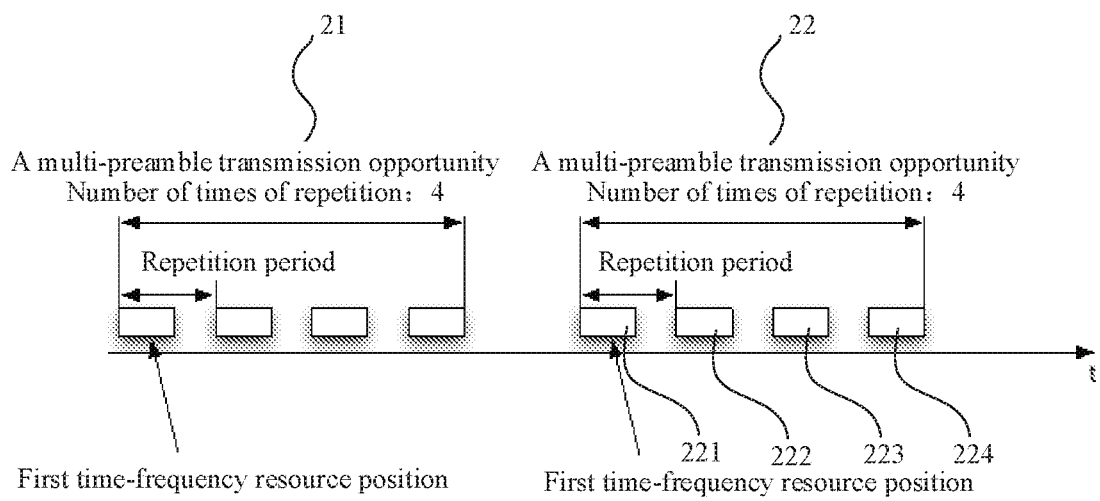
FIG. 2A is a schematic diagram illustrating a multi-preamble transmission opportunity, according to an exemplary embodiment.

The multi-preamble transmission opportunity may include a starting time-frequency resource position, a repetition period, and a number of times of repetition of the PRACH resource. For example, FIG. 2A is a schematic diagram illustrating a starting time-frequency resource position, a repetition period, and a number of times of repetition of a PRACH resource in a multi-preamble transmission opportunity, according to an exemplary embodiment.

Referring to back to FIG. 1, in S102, preamble transmission is started from any time-frequency resource position in the present multi-preamble transmission opportunity, and responsive to all preambles having been transmitted, monitoring a random access response (RAR) receiving window is started.

A starting position of the RAR receiving window is at a predetermined interval, for example, a subframe, after the end of the multi-preamble transmission opportunity.

Figure 2B:
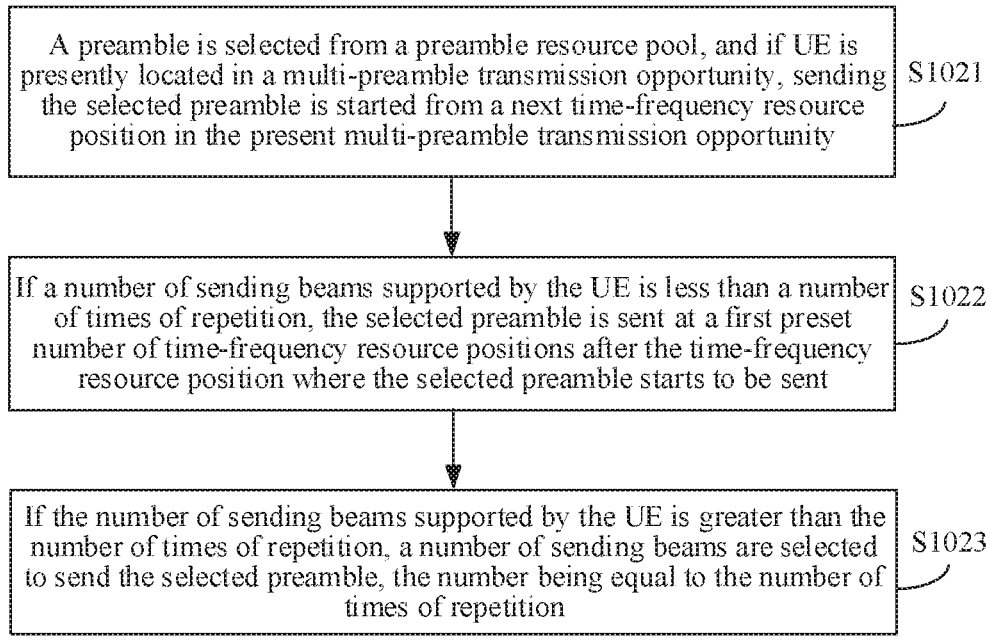
FIG. 2B is a flow chart illustrating an operation that preamble transmission is started from any time-frequency resource position in a present multi-preamble transmission opportunity, according to an exemplary embodiment.

In an embodiment, as shown in FIG. 2B, the operation that preamble transmission is started from any time-frequency resource position in the present multi-preamble transmission opportunity may include the following actions.

In S1021, a preamble is selected from a preamble resource pool, and if the UE is presently located in a multi-preamble transmission opportunity, sending the selected preamble is started from a next time-frequency resource position in the present multi-preamble transmission opportunity.

Descriptions are made with reference to the multi-preamble transmission opportunity shown in FIGS. 2A and 2B. In FIG. 2A, it is assumed that a number of times of repetition of the PRACH resource in each of a multi-preamble transmission opportunity 21 and a multi-preamble transmission opportunity 22 is 4. If the UE is presently at a time-frequency resource position 221 in the multi-preamble transmission opportunity 22, the UE, after selecting a preamble from a preamble resource pool, may start sending the selected preamble from a next time-frequency resource position, i.e., a time-frequency resource position 222, in the present multi-preamble transmission opportunity 22.

In S1022, if a number of sending beams supported by the UE is less than the number of times of repetition, the selected preamble is sent at a first preset number of time-frequency resource positions after the time-frequency resource position where the selected preamble starts to be sent. The first preset number is equal to a difference obtained by subtracting 1 from the number of sending beams.

For example, if the number of sending beams supported by the UE is 3, namely the number of sending beams supported by the UE is less than the number of times of repetition, the selected preamble is sent at two time-frequency resource positions, i.e., time-frequency resource positions 223 and 224, after the time-frequency resource position 222.

In S1023, if the number of sending beams supported by the UE is greater than the number of times of repetition, a number of sending beams are selected to send the selected preamble, the number being equal to the number of times of repetition.

For example, if the number of sending beams presently supported by the UE is 5, namely the number of sending beams supported by the UE is greater than the number of times of repetition, four sending beams are selected to send the selected preamble.

Referring back to FIG. 1, in S103, if an RAR is received in the RAR receiving window, a sending beam that the RAR corresponds to is determined, a third message (MSG3) is sent to a base station through the sending beam, and a fourth message (MSG4) returned by the base station is waited to be received.

Figure 2C:
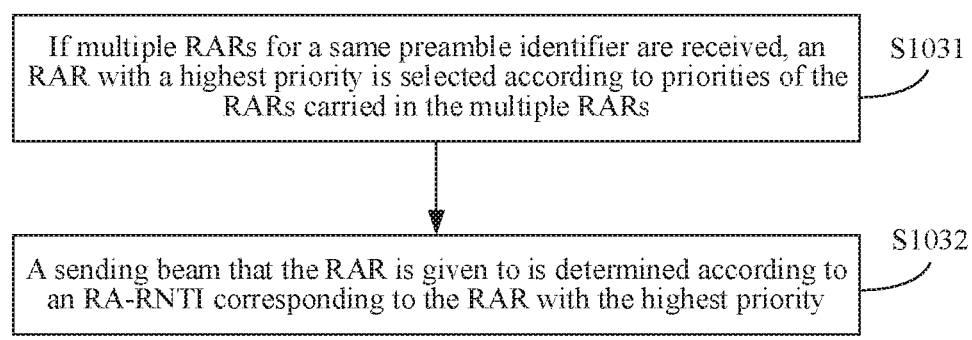
FIG. 2C is a flow chart illustrating an operation that a sending beam that an RAR corresponds to is determined, according to an exemplary embodiment.

In an embodiment, as shown in FIG. 2C, the operation that the sending beam that the RAR corresponds to is determined may include the following actions.

In S1031, if multiple RARs for a same preamble identifier are received, an RAR with a highest priority is selected according to priorities of the RARs carried in the multiple RARs.

In S1032, the sending beam that the RAR corresponds to is determined according to a Random Access Radio Network Temporary Identifier (RA-RNTI) corresponding to the RAR with the highest priority.

According to the embodiment, the RAR with the highest priority is determined, and the sending beam that the RAR corresponds to is determined according to the RA-RNTI of the RAR with the highest priority. The UE may subsequently send the MSG3 to the base station through the determined sending beam and wait to receive the MSG4 returned by the base station, so that random access is implemented.

According to the embodiment, when initiating random access, the PRACH resource, used to indicate the multi-preamble transmission opportunity, for multi-preamble transmission is acquired from the presently associated downlink beam, then preamble transmission is started from any time-frequency resource position in the present multi-preamble transmission opportunity, and monitoring the RAR receiving window is started when transmission of all the preambles is ended. Therefore, it is unnecessary to start monitoring the RAR receiving window when transmission of each preamble is ended, so that resource consumption may be reduced.

Figure 3:
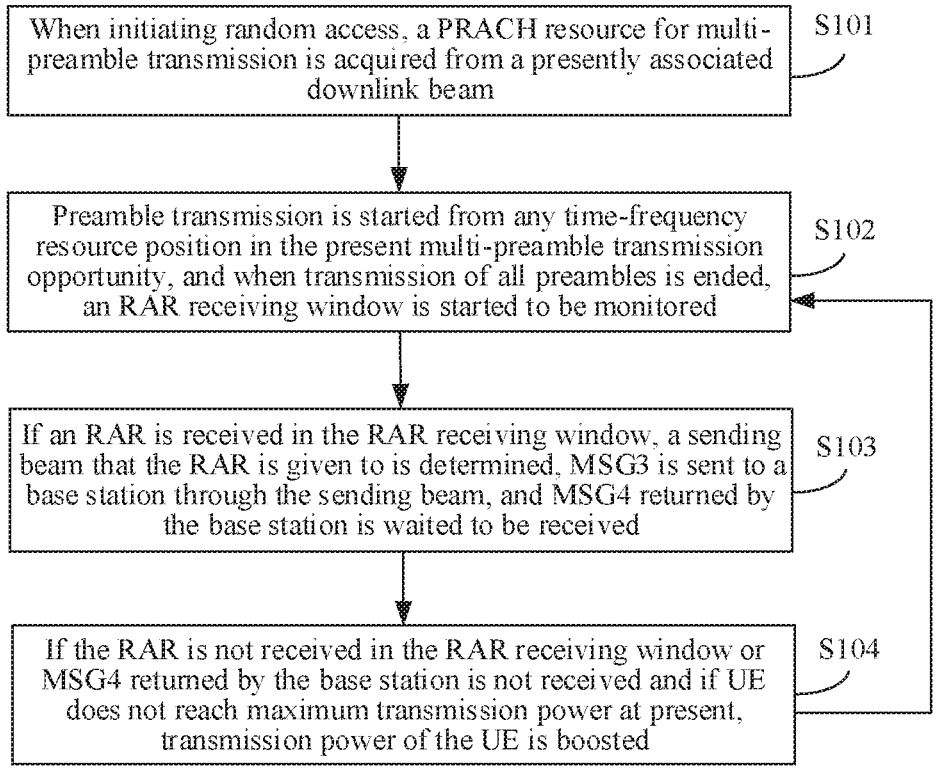
FIG. 3 is a flow chart showing a random access process, according to an exemplary embodiment.

FIG. 3 is a flow chart showing a random access method, according to an exemplary embodiment of the present application. As shown in FIG. 3, after S103, the random access method may further include the following operation.

In S104, if the RAR is not received in the RAR receiving window or the MSG4 returned by the base station is not received, and if the UE does not reach a maximum transmission power at present, transmission power of the UE is boosted, and the process proceeds to S102.

In the embodiment, the UE transmits preambles with the same identifier in the multi-preamble transmission opportunity. After a multi-preamble transmission is completed, if the RAR is not received in the RAR receiving window or the MSG4 returned by the base station is not received, and if the UE does not reach the maximum transmission power at present, the transmission power of the UE may be boosted, so as to receive the RAR or the MSG4, so that random access may be implemented.

According to the embodiment, if the RAR is not received in the RAR receiving window or the MSG4 returned by the base station is not received, and if the UE does not reach the maximum transmission power at present, the transmission power of the UE may be boosted, so as to receive the RAR or the MSG4, so that a probability that random access may be implemented is increased.

Figure 4:
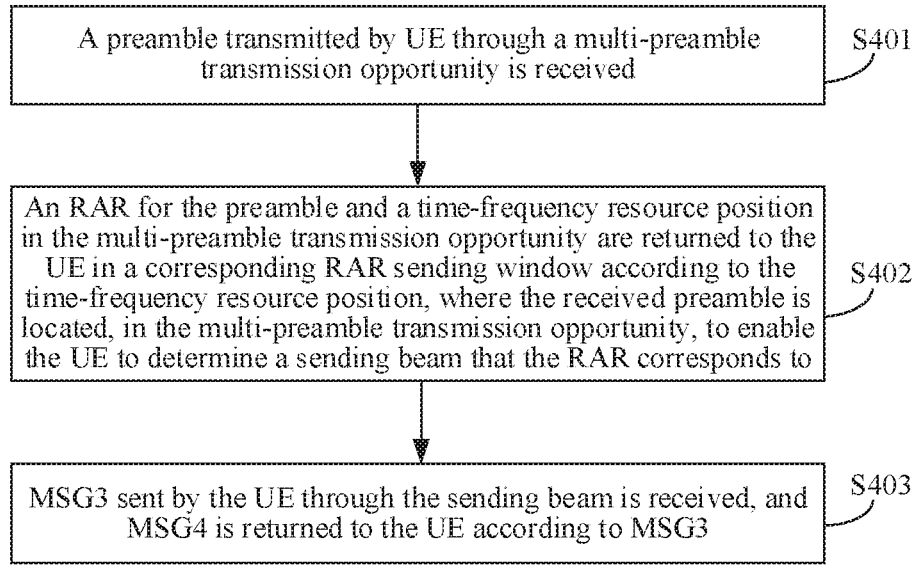
FIG. 4 is a flow chart showing a random access method, according to an exemplary embodiment.

FIG. 4 is a flow chart showing a random access method, according to an exemplary embodiment of the present application. For example, the method may be performed by a base station. As shown in FIG. 4, the random access method includes the following operations.

In S401, a preamble transmitted by UE through a multi-preamble transmission opportunity is received.

The multi-preamble transmission opportunity may include a starting time-frequency resource position, a repetition period and a number of times of repetition of a PRACH resource. For example, FIG. 2A is a schematic diagram illustrating a starting time-frequency resource position, repetition period and a number of times of repetition of a PRACH resource in a multi-preamble transmission opportunity.

In the embodiment, the UE, after determining to adopt multi-preamble transmission, may transmit the preamble through the acquired multi-preamble transmission opportunity, and a base station receives the preamble transmitted by the UE through the multi-preamble transmission opportunity.

In S402, an RAR for the preamble and a time-frequency resource position in the multi-preamble transmission opportunity are returned to the UE in a corresponding RAR sending window according to the time-frequency resource position, where the received preamble is located, in the multi-preamble transmission opportunity, to enable the UE to determine a sending beam that the RAR corresponds to. The RAR sending window corresponds to an RAR receiving window used by the UE to receive the RAR.

In the embodiment, an RAR for the preamble may be returned to the UE in the corresponding RAR sending window according to at least one of an Orthogonal Frequency Division Multiplexing (OFDM) symbol position, subframe position or frequency-domain position where the received preamble is located. The RAR contains an identifier of the preamble sent at the time-frequency resource position and a priority of the RAR.

At least one of the OFDM symbol position, the subframe position or the frequency-domain position may be represented by an RA-RNTI.

In S403, a third message MSG3 sent by the UE through the sending beam is received, and a fourth message MSG4 is returned to the UE according to the MSG3.

The base station receives the MSG3 sent by the UE through the determined sending beam and returns the MSG4 to the UE, such that the UE may complete a random access process.

According to the embodiment, the preamble transmitted by the UE through the multi-preamble transmission opportunity is received, and the RAR for the preamble and the time-frequency resource position in the multi-preamble transmission opportunity is returned to the UE in the corresponding RAR sending window according to the time-frequency resource position, where the received preamble is located, in the multi-preamble transmission opportunity. The UE starts monitoring the RAR receiving window when transmission of all preambles is ended, so that resource consumption may be reduced.

Figure 5:
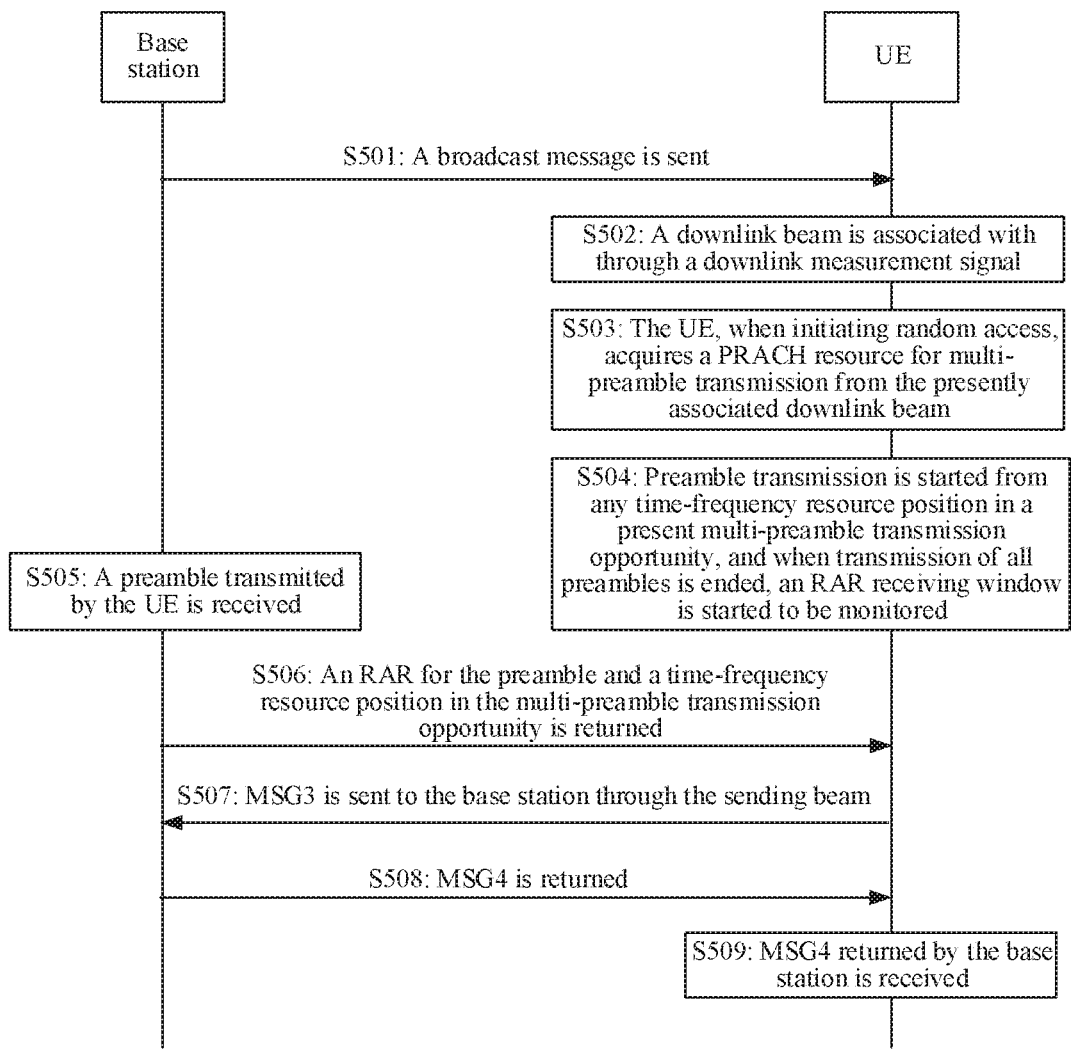
FIG. 5 is a signaling flow chart showing a random access method, according to an exemplary embodiment.

FIG. 5 is a flow chart showing a random access method, according to an exemplary embodiment of the present application. As shown in FIG. 5, the random access method includes the following operations.

In S501, the base station sends a broadcast message to the UE. The broadcast message contains a PRACH resource for multi-preamble transmission through each beam.

The PRACH resource is to indicate a multi-preamble transmission opportunity, and the multi-preamble transmission through each beam has a respective dedicated PRACH resource. The multi-preamble transmission opportunity may include a starting time-frequency resource position, a repetition period and a number of times of repetition of the PRACH resource. The PRACH resource may include a preamble identifier. In addition, the PRACH resource may further include a size of an RAR receiving window.

In S502, the UE is associated with a downlink beam by using a downlink measurement signal.

In S503, the UE, when initiating random access, acquires a PRACH resource for multi-preamble transmission from the presently associated downlink beam. The PRACH resource is to indicate a multi-preamble transmission opportunity.

In S504, the UE starts preamble transmission from any time-frequency resource position in the present multi-preamble transmission opportunity, and when transmission of all preambles is ended, the UE starts monitoring an RAR receiving window.

In S505, the base station receives a preamble transmitted by the UE.

In S506, the base station returns an RAR for the preamble and a time-frequency resource position in the multi-preamble transmission opportunity to the UE in a corresponding RAR sending window according to the time-frequency resource position, where the received preamble is located, in the multi-preamble transmission opportunity.

In S507, the UE, when receiving the RAR in the RAR receiving window, determines a sending beam that the RAR corresponds to and sends a MSG3 to the base station through the sending beam.

The RAR receiving window corresponds to the RAR sending window.

In S508, the base station receives the MSG3 sent by the UE and returns a MSG4 to the UE.

In S509, the UE receives MSG4 returned by the base station.

According to the embodiment, through interaction between the UE and the base station, the UE may start preamble transmission from any time-frequency resource position in the present multi-preamble transmission opportunity and start monitoring the RAR receiving window when transmission of all the preambles is ended. The base station, after receiving the preamble transmitted by the UE through the multi-preamble transmission opportunity, may return the RAR for the preamble and the time-frequency resource position in the multi-preamble transmission opportunity to the UE in the corresponding RAR sending window according to the time-frequency resource position, where the received preamble is located, in the multi-preamble transmission opportunity, to enable the UE to perform random access, so that multi-preamble transmission in a multi-beam scenario is implemented, and resource consumption is reduced.

Figure 6:
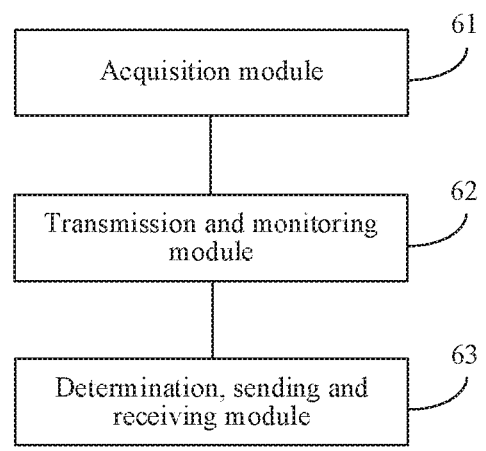
FIG. 6 is a block diagram of a random access device, according to an exemplary embodiment.

FIG. 6 is a block diagram of a random access device, according to an exemplary embodiment. As shown in FIG. 6, the random access device includes an acquisition module 61, a transmission and monitoring module 62 and a determination, sending and receiving module 63.

The acquisition module 61 is configured to, when initiating random access, acquire a PRACH resource for multi-preamble transmission from a presently associated downlink beam. The PRACH resource is to indicate a multi-preamble transmission opportunity.

The multi-preamble transmission opportunity may include a starting time-frequency resource position, a repetition period and a number of times of repetition of a PRACH resource. For example, FIG. 2A is a schematic diagram illustrating a starting time-frequency resource position, repetition period and a number of times of repetition of a PRACH resource in a multi-preamble transmission opportunity.

The transmission and monitoring module 62 is configured to transmit a preamble at any time-frequency resource position in a present multi-preamble transmission opportunity indicated by the PRACH resource acquired by the acquisition module 61 and, when transmission of all preambles is ended, monitor an RAR receiving window.

A starting position of the RAR receiving window is at a predetermined interval, for example, a subframe, after the end of the multi-preamble transmission opportunity.

The determination, sending and receiving module 63 is configured to, if the transmission and monitoring module 62 receives an RAR in the RAR receiving window, determine a sending beam that the RAR corresponds to, send a third message MSG3 to a base station through the sending beam and wait to receive a fourth message MSG4 returned by the base station.

According to the embodiment, when initiating random access, the PRACH resource, which is to indicate the multi-preamble transmission opportunity, for multi-preamble transmission is acquired from the presently associated downlink beam, and preamble transmission is started from any time-frequency resource position in the present multi-preamble transmission opportunity. Monitoring the RAR receiving window is started when transmission of all the preambles is ended. Therefore, it is unnecessary to start monitoring the RAR receiving window when transmission of each preamble is ended, so that resource consumption may be reduced.

Figure 7:
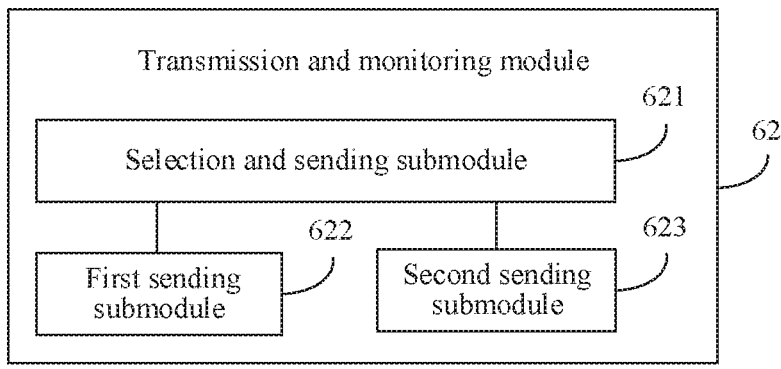
FIG. 7 is a block diagram of a random access device, according to an exemplary embodiment.

FIG. 7 is a block diagram of a random access device, according to an exemplary embodiment. As shown in FIG. 7, based on the embodiment shown in FIG. 6, the multi-preamble transmission opportunity includes a starting time-frequency resource position, a repetition period and a number of times of repetition of the PRACH resource. The transmission and monitoring module 62 may include a selection and sending submodule 621, a first sending submodule 622 and a second sending submodule 623.

The selection and sending submodule 621 is configured to select a preamble from a preamble resource pool and, if UE is presently located in the multi-preamble transmission opportunity, start sending the selected preamble from a next time-frequency resource position in the present multi-preamble transmission opportunity.

Descriptions are made with reference to the multi-preamble transmission opportunity shown in FIG. 2A. In FIG. 2A, it is assumed that the number of times of repetition of the PRACH resource in the multi-preamble transmission opportunity is 4. If the UE is presently at a time-frequency resource position 221 in the multi-preamble transmission opportunity 22, the UE, after selecting a preamble from a preamble resource pool, may start sending the selected preamble from a next time-frequency resource position, i.e., a time-frequency resource position 222, in the present multi-preamble transmission opportunity.

The first sending submodule 622 is configured to, if a number of sending beams supported by the UE is less than the number of times of repetition, send the preamble selected by the selection and sending submodule 621 at a first preset number of time-frequency resource positions after the time-frequency resource position where the selected preamble starts to be sent. The first preset number is equal to a difference obtained by subtracting 1 from the number of sending beams.

For example, if the number of sending beams supported by the UE is 3, namely the number of sending beams supported by the UE is less than the number of times of repetition, the selected preamble is sent at two time-frequency resource positions, i.e., time-frequency resource positions 223 and 224, after the time-frequency resource position 222.

The second sending submodule 623 is configured to, if the number of sending beams supported by the UE is greater than the number of times of repetition, select a number of sending beams to send the preamble selected by the selection and sending submodule 621, the number being equal to the number of times of repetition.

For example, if the number of sending beams presently supported by the UE is 5, namely the number of sending beams supported by the UE is greater than the number of times of repetition, four sending beams are selected to send the selected preamble.

According to the embodiment, sending the selected preamble is started from a next time-frequency resource position in the present multi-preamble transmission opportunity, and the time-frequency resource positions for sending the preamble are selected according to a magnitude relationship between the number of sending beams supported by the UE and the number of times of repetition, so that the base station may return the RAR according to the time-frequency resource position where the received preamble is located.

Figure 8A:
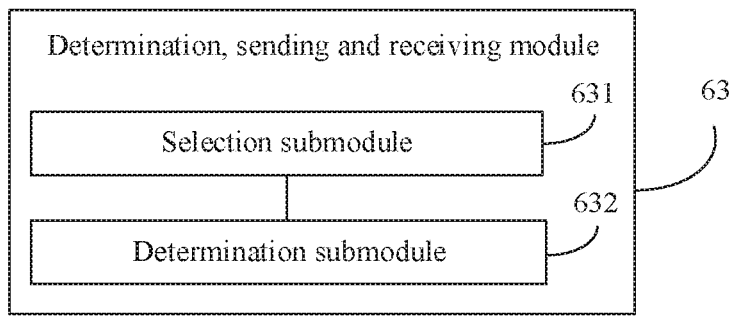
FIG. 8A is a block diagram of a random access device, according to an exemplary embodiment.

FIG. 8A is a block diagram of a random access device, according to an exemplary embodiment. As shown in FIG. 8A, based on the embodiment shown in FIG. 6, the determination, sending and receiving module 63 may include a selection submodule 631 and a determination submodule 632.

The selection submodule 631 is configured to, if multiple RARs for a same preamble identifier are received, select an RAR with a highest priority according to priorities of the RARs carried in the multiple RARs.

The determination submodule 632 is configured to determine the sending beam that the RAR corresponds to according to an RA-RNTI corresponding to the RAR, selected by the selection submodule 631, with the highest priority.

According to the embodiment, the RAR with the highest priority is determined, the sending beam that the RAR corresponds to is determined according to the RA-RNTI of the RAR with the highest priority. Then, the UE may subsequently send the MSG3 to the base station through the determined sending beam and wait to receive the MSG4 returned by the base station, so that random access is implemented.

Figure 8B:
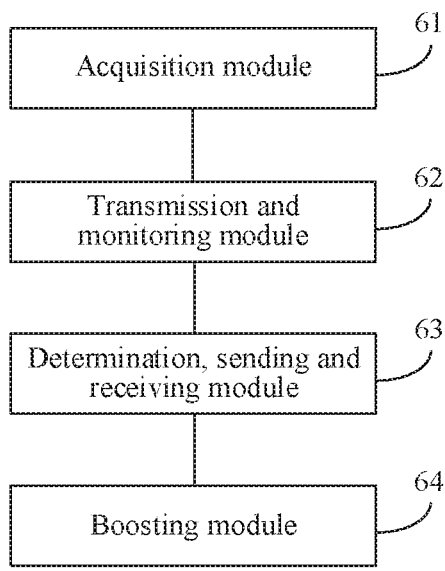
FIG. 8B is a block diagram of a random access device, according to an exemplary embodiment.

FIG. 8B is a block diagram of a random access device, according to an exemplary embodiment. As shown in FIG. 8B, based on the embodiment shown in FIG. 6, the device may further include a boosting module 64.

The boosting module 64 is configured to, if the determination, sending and receiving module 63 does not receive the RAR in the RAR receiving window or does not receive the MSG4 returned by the base station and if the UE does not reach a maximum transmission power at present, boost transmission power of the UE and call the transmission and monitoring module to start preamble transmission from any occasion in the present multi-preamble transmission opportunity.

In the embodiment, the UE transmits preambles with the same identifier in the multi-preamble transmission opportunity. After a multi-preamble transmission is completed, if the RAR is not received in the RAR receiving window or the MSG4 returned by the base station is not received and if the UE does not reach the maximum transmission power at present, the transmission power of the UE may be boosted so as to receive the RAR or the MSG4, so that random access may be implemented.

According to the embodiment, if the RAR is not received in the RAR receiving window or the MSG4 returned by the base station is not received and if the UE does not reach the maximum transmission power at present, the transmission power of the present UE may be boosted so as to receive the RAR or the MSG4, so that a probability that random access may be implemented is increased.

Figure 8C:
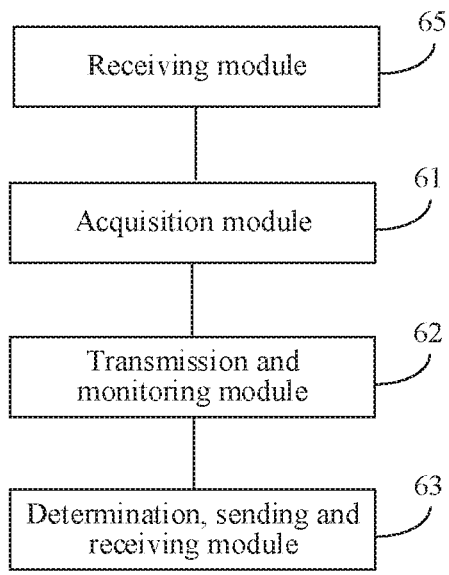
FIG. 8C is a block diagram of a random access device, according to an exemplary embodiment.

FIG. 8C is a block diagram of a random access device, according to an exemplary embodiment. As shown in FIG. 8C, based on the embodiment shown in FIG. 6, the device may further include a receiving module 65.

The receiving module 65 is configured to, before the acquisition module 61 acquires the PRACH resource for multi-preamble transmission from the presently associated downlink beam, receive a broadcast message sent by the base station. The broadcast message contains a PRACH resource for multi-preamble transmission through each beam.

The PRACH resource is to indicate a multi-preamble transmission opportunity, and the multi-preamble transmission through each beam has a respective dedicated PRACH resource. The multi-preamble transmission opportunity may include a starting time-frequency resource position, repetition period and a number of times of repetition of the PRACH resource. In addition, optionally, the PRACH resource may further include a preamble identifier. Furthermore, the PRACH resource may further include a size of the RAR receiving window.

According to the embodiment, the broadcast message sent by the base station is received, thereby providing a condition for subsequently sending the preamble according to the PRACH resource in the broadcast message.

Figure 9:
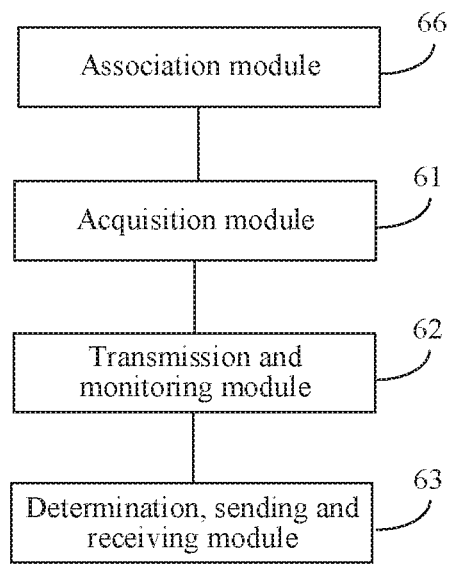
FIG. 9 is a block diagram of a random access device, according to an exemplary embodiment.

FIG. 9 is a block diagram of a random access device, according to an exemplary embodiment. As shown in FIG. 9, based on the embodiment shown in FIG. 6, the device may further include an association module 66.

The association module 66 is configured to, before the acquisition module 61 acquires the PRACH resource for multi-preamble transmission from the presently associated downlink beam, associate with a downlink beam through a downlink measurement signal.

According to the embodiment, the downlink beam is associated with through the downlink measurement signal, thereby providing a condition for subsequently acquiring the PRACH resource for multi-preamble transmission from the presently associated downlink beam.

Figure 10:
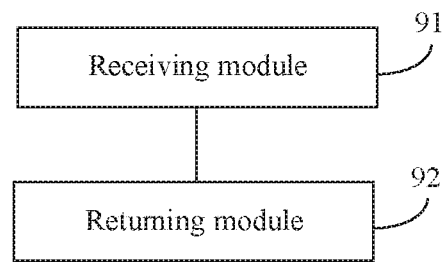
FIG. 10 is a block diagram of a random access device, according to an exemplary embodiment.

FIG. 10 is a block diagram of a random access device, according to an exemplary embodiment. As shown in FIG. 10, the random access device includes a receiving module 91 and a returning module 92.

The receiving module 91 is configured to receive a preamble transmitted by UE through a multi-preamble transmission opportunity.

The multi-preamble transmission opportunity may include an initial time-frequency resource position, a repetition period and a number of times of repetition of a PRACH. For example, FIG. 2A is a schematic diagram illustrating a starting time-frequency resource position, repetition period and a number of times of repetition of a PRACH resource in a multi-preamble transmission opportunity.

In the embodiment, the UE, after determining to adopt multi-preamble transmission, may transmit the preamble through the acquired multi-preamble transmission opportunity, and a base station receives the preamble transmitted by the UE through the multi-preamble transmission opportunity.

The returning module 92 is configured to return an RAR for the preamble and a time-frequency resource position in the multi-preamble transmission opportunity to the UE in a corresponding RAR sending window according to the time-frequency resource position, where the preamble received by the receiving module 91 is located, in the multi-preamble transmission opportunity, to enable the UE to determine a sending beam that the RAR corresponds to. The RAR sending window corresponds to an RAR receiving window configured for the UE to receive the RAR.

In the embodiment, an RAR for the preamble may be returned to the UE in the corresponding RAR sending window according to at least one of an OFDM symbol position, subframe position or frequency-domain position where the received preamble is located. The RAR contains an identifier of the preamble sent at the time-frequency resource position and indicates a priority of the RAR.

At least one of the OFDM symbol position, the subframe position or the frequency-domain position may be represented by an RA-RNTI.

A receiving and sending module is configured to receive a third message MSG3 sent by the UE through the sending beam and return a fourth message MSG4 to the UE according to MSG3.

The base station receives the MSG3 sent by the UE through the determined sending beam and returns the MSG4 to the UE, such that the UE may complete a random access process.

According to the embodiment, the preamble transmitted by the UE through the multi-preamble transmission opportunity is received, and the RAR for the preamble and the time-frequency resource position in the multi-preamble transmission opportunity is returned to the UE in the corresponding RAR sending window according to the time-frequency resource position, where the received preamble is located, in the multi-preamble transmission opportunity, such that the UE starts monitoring the RAR receiving window when transmission of all preambles is ended, so that resource consumption may be reduced.

Figure 11:
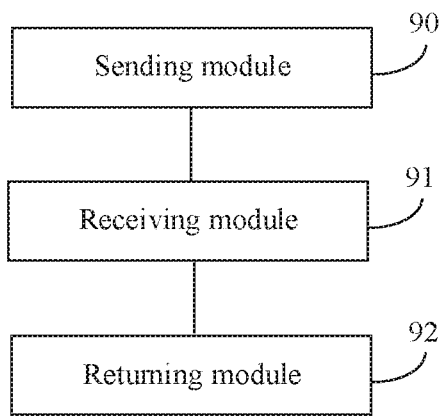
FIG. 11 is a block diagram of a random access device, according to an exemplary embodiment.

FIG. 11 is a block diagram of a random access device, according to an exemplary embodiment. As shown in FIG. 11, based on the embodiment shown in FIG. 10, the device may further include a sending module 90.

The sending module 90 is configured to, before the receiving module 91 receives the preamble transmitted by the UE through the multi-preamble transmission opportunity, send a broadcast message to the UE. The broadcast message contains a PRACH resource for multi-preamble transmission through each beam.

According to the embodiment, the broadcast message is sent to the UE, so that the UE may send the preamble according to the PRACH resource in the broadcast message.

The device embodiments substantially correspond to the method embodiments, and thus reference may be made to the method embodiments for the operations of the modules. The modules described as separate parts may or may not be physically separated, and may be located in the same place or may also be distributed to multiple networks. Part or all of the modules may be selected according to a practical requirement to achieve the purpose of the solutions of the embodiments.

Figure 12:
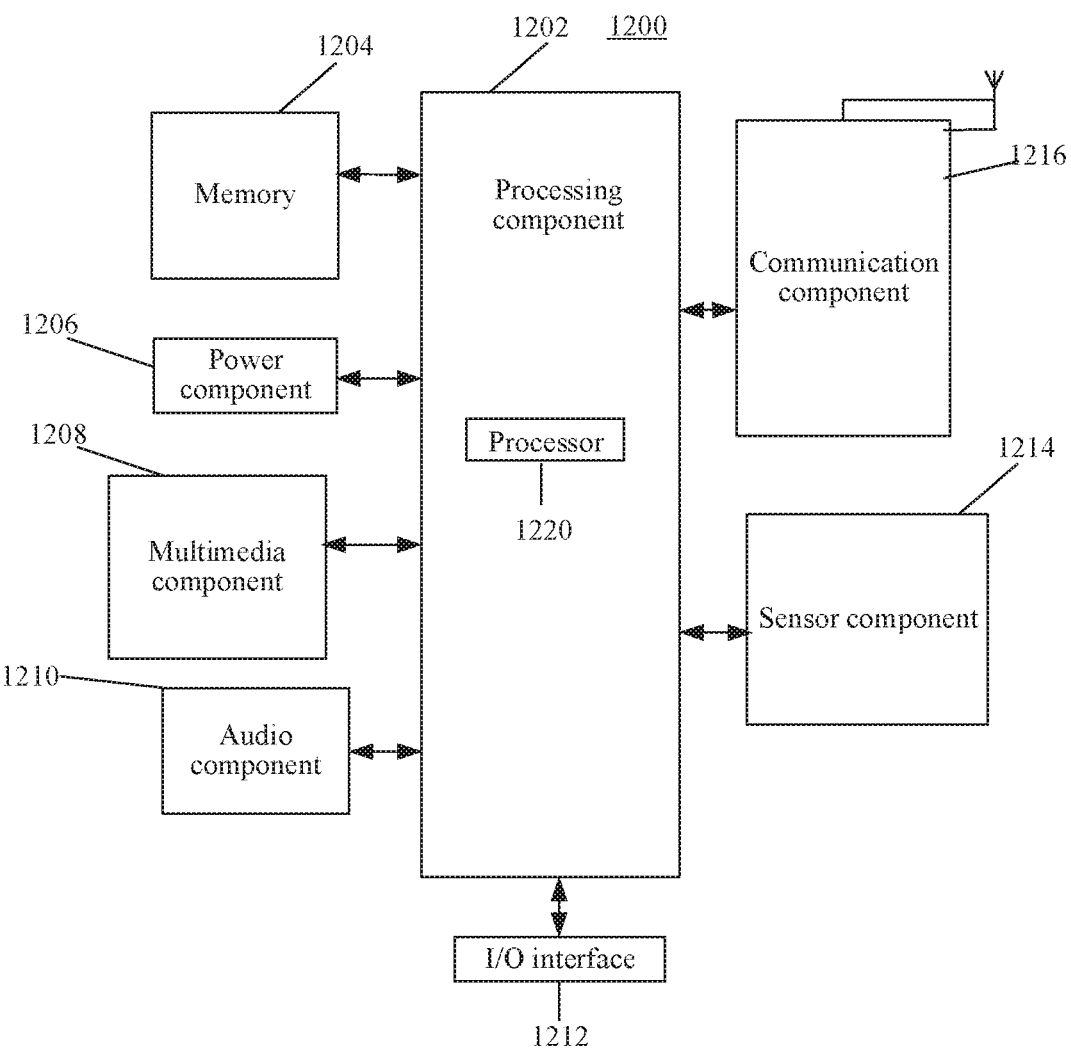
FIG. 12 is a block diagram of a device applied to random access, according to an exemplary embodiment.

FIG. 12 is a block diagram of a device applied to random access, according to an exemplary embodiment. For example, the device 1200 may be UE such as a mobile phone, a computer, a digital broadcast terminal, a messaging device, a gaming console, a tablet, a medical device, exercise equipment or a personal digital assistant.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

The memory 1204 is configured to store various types of data to support the operations of the device 1200. Examples of such data include instructions for any application programs or methods operated on the device 1200, contact data, phonebook data, messages, pictures, videos, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the device 1200. The power component 1206 may include a power management system, one or more power supplies, and other components associated with generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200. The sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (WiFi) network, a 4th-Generation (4G) or 5th-Generation (5G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. In an exemplary embodiment, the communication component 1216 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1204 including an instruction, and the instruction may be executed by the processor 1220 of the device 1200 to implement the above described method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 13:
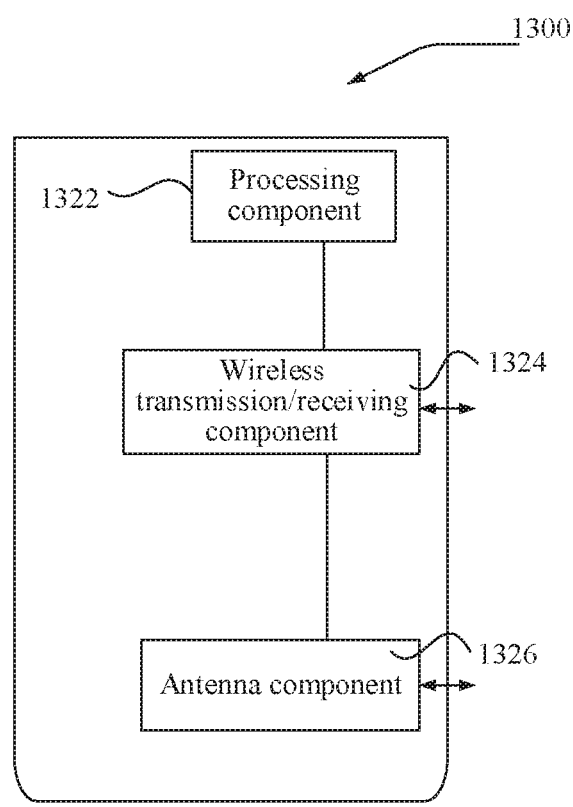
FIG. 13 is a block diagram of a device applied to random access, according to an exemplary embodiment.

FIG. 13 is a block diagram of a device applied to random access, according to an exemplary embodiment. The device 1300 may be provided as a base station. Referring to FIG. 13, the device 1300 includes a processing component 1322, a wireless transmission/receiving component 1324, an antenna component 1326 and a wireless interface-specific signal processing part, and the processing component 1322 may further include one or more processors.

One processor in the processing component 1322 may be configured to perform the above described random access method.

In an exemplary embodiment, there is also provided a non-transitory computer-readable storage medium including an instruction, and the instruction may be executed by the processing component 1322 of the device 1300 to implement the random access method. For example, the non-transitory computer-readable storage medium may be a ROM, a RAM, a CD-ROM, a magnetic tape, a floppy disc, an optical data storage device and the like.

It is to be noted that relational terms "first", "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Without any more limitations, an element defined by statement "including a/an . . . " does not exclude existence of another identical element in a process, method, object or device including the element.

Other embodiments of the present disclosure will be apparent to those skilled in the art from consideration of the specification and practice of the present disclosure. This application is intended to cover any variations, uses, or adaptations of the present disclosure following, in general, the principles of the disclosure, and including such departures from the present disclosure as come within known or customary practice in the art to which the invention pertains.

It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope of the disclosure. It is intended that the scope of the present disclosure only be limited by the appended claims.

What is claimed is:

1. A random access method for user equipment (UE), comprising:
   when initiating random access, acquiring a Physical Random Access Channel (PRACH) resource for multi-preamble transmission from a presently associated downlink beam, wherein the PRACH resource is to indicate a multi-preamble transmission opportunity;
   starting preamble transmission from a time-frequency resource position in a present multi-preamble transmission opportunity, and when transmission of all preambles is ended, starting monitoring a random access response (RAR) receiving window; and
   if an RAR is received in the RAR receiving window, determining a sending beam that the RAR corresponds to, sending a message MSG3 to a base station through the sending beam, and waiting to receive a message MSG4 returned by the base station,
   wherein determining the sending beam that the RAR corresponds to comprises:
   when a plurality of RARs for a same preamble identifier are received, selecting an RAR with a highest priority according to priorities of the plurality of RARs; and
   determining the sending beam that the RAR corresponds to according to a Random Access Radio Network Temporary Identifier (RA-RNTI) corresponding to the RAR with the highest priority.

2. The method of claim 1, wherein the multi-preamble transmission opportunity comprises a starting time-frequency resource position, a repetition period, and a number of times of repetition of the PRACH resource, and starting preamble transmission from a time-frequency resource position in the present multi-preamble transmission opportunity comprises:
   selecting a preamble from a preamble resource pool, and when the UE is presently located in the multi-preamble transmission opportunity, starting sending the selected preamble from a next time-frequency resource position in the present multi-preamble transmission opportunity;
   when a number of sending beams supported by the UE is less than the number of times of repetition, sending the selected preamble at a first preset number of time-frequency resource positions after the time-frequency resource position where the selected preamble starts to be sent, the first preset number being equal to a difference obtained by subtracting 1 from the number of sending beams; and
   when the number of sending beams supported by the UE is greater than the number of times of repetition, selecting a number of sending beams to send the selected preamble, the number being equal to the number of times of repetition.

3. The method of claim 1, further comprising:
   when the RAR is not received in the RAR receiving window or the message MSG4 returned by the base station is not received, and the UE does not reach a maximum transmission power at present, boosting transmission power of the UE and starting preamble transmission from a time-frequency resource position in the present multi-preamble transmission opportunity.

4. The method of claim 1, further comprising:
before acquiring the PRACH resource for multi-preamble transmission from the presently associated downlink beam, receiving a broadcast message sent by the base station, wherein the broadcast message contains a PRACH resource for multi-preamble transmission through each beam.

5. The method of claim 1, wherein the PRACH resource comprises at least one of a preamble identifier or a size of the RAR receiving window.

6. The method of claim 1, wherein the multi-preamble transmission opportunity comprises a starting time-frequency resource position, a repetition period, and a number of times of repetition of the PRACH resource, the method further comprising:
receiving an RAR for a preamble returned by the base station in the RAR receiving window, wherein the RAR for the preamble is returned by the base station according to at least one of an Orthogonal Frequency Division Multiplexing (OFDM) symbol position, a subframe position, or a frequency-domain position where the preamble is located, and the RAR for the preamble contains an identifier of the preamble sent at the time-frequency resource position and indicates a priority of the RAR.

7. A random access method for a base station, comprising:
receiving a preamble transmitted by user equipment (UE) through a time-frequency resource position in a present multi-preamble transmission opportunity;
returning a random access response (RAR) for the preamble and the time-frequency resource position in the present multi-preamble transmission opportunity to the UE in a corresponding RAR sending window according to the time-frequency resource position, where the received preamble is located, in the present multi-preamble transmission opportunity, to enable the UE to determine a sending beam that the RAR corresponds to, wherein the RAR sending window corresponds to an RAR receiving window configured for the UE to receive the RAR; and
receiving a message MSG3 sent by the UE through the sending beam, and returning a message MSG4 to the UE according to the message MSG3,
wherein returning the RAR comprises:
returning a plurality of RARs for a same preamble identifier, wherein an RAR with a highest priority is selected according to priorities of the plurality of RARs, and the sending beam that the RAR corresponds to is determined according to a Random Access Radio Network Temporary Identifier (RA-RNTI) corresponding to the RAR with the highest priority.

8. The method of claim 7, wherein the present multi-preamble transmission opportunity comprises a starting time-frequency resource position, a repetition period, and a number of times of repetition of a Physical Random Access Channel (PRACH) resource, and returning the RAR for the preamble and the time-frequency resource position in the present multi-preamble transmission opportunity to the UE in the corresponding RAR sending window according to the time-frequency resource position, where the received preamble is located, in the present multi-preamble transmission opportunity comprises:
returning an RAR for the preamble to the UE in the corresponding RAR sending window according to at least one of an Orthogonal Frequency Division Multiplexing (OFDM) symbol position, a subframe position, or a frequency-domain position where the received preamble is located, the RAR containing an identifier of the preamble sent at the time-frequency resource position and indicating a priority of the RAR.

9. The method of claim 8, wherein at least one of the OFDM symbol position, the subframe position, or the frequency-domain position is represented by the RA-RNTI.

10. The method of claim 7, further comprising:
before receiving the preamble transmitted by the UE through the present multi-preamble transmission opportunity, sending a broadcast message to the UE, wherein the broadcast message contains a PRACH resource for multi-preamble transmission through each beam.

11. The method of claim 10, wherein the PRACH resource is to indicate a multi-preamble transmission opportunity, and the multi-preamble transmission opportunity comprises a starting time-frequency resource position, a repetition period, and a number of times of repetition of the PRACH resource.

12. The method of claim 11, wherein the PRACH resource comprises at least one of a preamble identifier or a size of the RAR receiving window.

13. User equipment (UE), comprising:
a processor; and
a memory configured to store an instruction executable for the processor,
wherein the processor is configured to:
when initiating random access, acquire a Physical Random Access Channel (PRACH) resource for multi-preamble transmission from a presently associated downlink beam, wherein the PRACH resource is to indicate a multi-preamble transmission opportunity;
start preamble transmission from a time-frequency resource position in a present multi-preamble transmission opportunity indicated by the PRACH resource and, when transmission of all preambles is ended, start monitoring a random access response (RAR) receiving window; and
if an RAR is received in the RAR receiving window, determine a sending beam that the RAR corresponds to, send a message MSG3 to a base station through the sending beam and wait to receive a message MSG4 returned by the base station,
wherein in determining the sending beam that the RAR corresponds to, the processor is further configured to:
when a plurality of RARs for a same preamble identifier are received, select an RAR with a highest priority according to priorities of the plurality of RARs; and
determine the sending beam that the RAR corresponds to according to a Random Access Radio Network Temporary Identifier (RA-RNTI) corresponding to the RAR with the highest priority.

14. The UE of claim 13, wherein the multi-preamble transmission opportunity comprises a starting time-frequency resource position, a repetition period, and a number of times of repetition of the PRACH resource, and the processor is further configured to:
select a preamble from a preamble resource pool and, when the UE is presently located in the multi-preamble transmission opportunity, start sending the selected preamble from a next time-frequency resource position in the present multi-preamble transmission opportunity;

when a number of sending beams supported by the UE is less than the number of times of repetition, send the selected preamble at a first preset number of time-frequency resource positions after the time-frequency resource position where the selected preamble starts to be sent, the first preset number being equal to a difference obtained by subtracting 1 from the number of sending beams; and when the number of sending beams supported by the UE is greater than the number of times of repetition, select a number of sending beams to send the selected preamble, the number being equal to the number of times of repetition.

15. The UE of claim 13, wherein the processor is further configured to:

when the processor does not receive the RAR in the RAR receiving window or does not receive the message MSG4 returned by the base station, and the UE does not reach a maximum transmission power at present, boost transmission power of the UE and start preamble transmission from a time-frequency resource position in the present multi-preamble transmission opportunity.

16. The UE of claim 13, wherein the processor is further configured to:

before acquiring the PRACH resource for multi-preamble transmission from the presently associated downlink beam, receive a broadcast message sent by the base station, wherein the broadcast message contains a PRACH resource for multi-preamble transmission through each beam.

17. The UE of claim 13, wherein the PRACH resource comprises at least one of a preamble identifier or a size of the RAR receiving window.

18. The UE of claim 13, wherein the multi-preamble transmission opportunity comprises a starting time-frequency resource position, a repetition period, and a number of times of repetition of the PRACH resource, and the processor is further configured to:

receive an RAR for a preamble returned by the base station in the RAR receiving window, wherein the RAR for the preamble is returned by the base station according to at least one of an Orthogonal Frequency Division Multiplexing (OFDM) symbol position, a subframe position, or a frequency-domain position where the preamble is located, and the RAR for the preamble contains an identifier of the preamble sent at the time-frequency resource position and indicates a priority of the RAR.

\* \* \* \* \*